(12) United States Patent
Kitagawa

(10) Patent No.: US 6,404,447 B1
(45) Date of Patent: *Jun. 11, 2002

(54) CONTROL METHOD FOR CONTROLLING SCREEN SAVER FUNCTION, APPARATUS AND SYSTEM ADOPTING THE METHOD

(75) Inventor: Eiichiro Kitagawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,763

(22) Filed: Feb. 6, 1998

(30) Foreign Application Priority Data

Feb. 21, 1997 (JP) .............................. 9-037753

(51) Int. Cl.$^7$ ........................... H05K 13/08; G09G 3/00
(52) U.S. Cl. ....................................... 345/867; 345/718
(58) Field of Search ................................ 345/112, 339, 345/117, 328, 329–332, 326, 156, 856, 723–726, 738–743, 751–759, 701–702, 727, 728, 769–770, 426, 718, 867

(56) References Cited

U.S. PATENT DOCUMENTS

| | | | |
|---|---|---|---|
| 5,642,185 A | | 6/1997 | Altrieth, III et al. |
| 5,675,510 A | * | 10/1997 | Coffey et al. ................ 709/224 |
| 5,680,535 A | * | 10/1997 | Harbin ........................ 345/473 |
| 5,706,457 A | * | 1/1998 | Dwyer et al. ................ 345/349 |
| 5,757,418 A | * | 5/1998 | Inagaki ........................ 348/15 |
| 5,768,604 A | | 6/1998 | Yamazaki et al. |
| 5,815,080 A | * | 9/1998 | Taguchi ....................... 345/326 |
| 5,850,260 A | * | 12/1998 | Rosenberg ................... 348/416 |
| 5,880,731 A | * | 3/1999 | Liles et al. ................... 345/349 |
| 5,995,096 A | * | 11/1999 | Kitahara et al. ............. 345/330 |
| 6,002,403 A | * | 12/1999 | Sugiyama et al. ........... 345/327 |
| 6,018,806 A | * | 1/2000 | Cortopassi et al. ............ 714/8 |

FOREIGN PATENT DOCUMENTS

| | | |
|---|---|---|
| JP | 09-128105 | 5/1997 |
| JP | 10124219 | 5/1998 |
| WO | WO 97/17827 | 5/1997 |

OTHER PUBLICATIONS

Ultrasonic Motion Sensor for Display Monitor Power Saving, IBM Technical Disclosure Bulletin, vol. 37, No. 9, 9/94, pp. 121–122.

Controlling Voice Mail Systems from Workstations, IBM Technical Disclosure Bulletin, vol. 39, No. 1, 1/96, p. 53.

After Dark for Windows, Berkeley Systems, p. 8, 10, and 17, 1991.*

McCracken, Harry, VoiceLock is a sound solution to security, Infoworld, p. 97, Mar. 28, 1994.*

* cited by examiner

Primary Examiner—Raymond J. Bayerl
Assistant Examiner—Thomas J Joseph
(74) Attorney, Agent, or Firm—Morgan & Finnegan, LLP

(57) ABSTRACT

When a TV conference application program is initiated, a software timer is activated. The timer is set to a predetermined period, e.g., 30 seconds, which is shorter than the time when a screen saver image starts to be displayed, e.g., one minute. Every 30 seconds, a pseudo user input event of mouse displacement is generated. Accordingly, the time counter of a screen saver is cleared before the predetermined time when the screen saver image starts to be displayed has elapsed, thereby it is possible to prevent the screen saver image from being displayed during executing the TV conference application program.

58 Claims, 10 Drawing Sheets

CONTROL METHOD FOR CONTROLLING SCREEN SAVER FUNCTION, APPARATUS AND SYSTEM ADOPTING THE METHOD

BACKGROUND OF THE INVENTION

The present invention relates to a control method for controlling screen saver function, an apparatus and a system adopting the method and, more particularly, to an information processing apparatus in which a screen saver application program is installed, an image sensing system using the information processing apparatus, and a control method for controlling screen saver function during performing image sensing operation.

In an image sensing system, such as a desk-top TV conference system and a TV phone, a general-purpose work station or personal computer is often used as a platform of the system. The work station or personal computer executes an operating system (OS), such as a window operating system, and a TV conference or TV phone application program which works on the OS is installed in the work station or personal computer. In such system, a screen saver application program is often installed along with the OS or independently.

FIG. 8 is a block diagram illustrating a hardware configuration of a general desk-top TV conference system.

In FIG. 8, reference 100 denotes a computer unit; 101, a system bus; 102, a CPU for executing a program; 103, a clock; 104, a memory for temporary storing information; 105, a ROM; 106, a timer; 107, a user interface (I/F); 108, a keyboard; 109, a mouse; 110, a storage unit for storing a TV conference application program; 111, an image output I/F; 112, a monitor for displaying an image; and 113, a communication unit for communicating with an external device.

Further, reference numeral 200 denotes a TV conference hardware; 201, an image input I/F; 202, a codec for compressing and expanding image data; 203, an audio I/F; 204, a codec for compressing and expanding audio data; 205, a multiplexing/separating unit for multiplexing and separating the audio data and the image data; 206, a communication unit for communicating with a destination terminal via a communication line as well as communicating with the computer unit 100; 207, a video camera as an image input device; 208, a microphone; and 209, a speaker.

Next, an operation of the disk-top TV conference system having the configuration as described above is explained with reference to flowcharts in FIGS. 9 and 10.

First, in step S301 in FIG. 9, the TV conference application program stored in the storage unit 110 is initiated and the disk-top TV conference system connects to a destination terminal via the communication line. When the connection is established, conference starts in step S302.

Steps S321 to S327 in FIG. 10 briefly shows a typical operation of a general screen saver. For using the screen saver, first, time when a screen saver image starts to be displayed is set in step S321, then an internal counter is cleared to 0 in step S322, thereby initialization is completed. When there is a user input event, determination in step S323 becomes YES and the process proceeds to step S324 where the counter is cleared to 0. When no user input event, such as an input through the keyboard 108 and the mouse 109, occurs, determination in step S323 becomes NO and the process proceeds to step S325 where the counter is increased. In step S326, the value of the counter and the time set in step S321 are compared. When the value of the counter is equal or greater than the set time, the screen saver image starts to be displayed in step S327.

Even when the user does not perform any input operation using the mouse 109 or the keyboard 108 for a while during the conference, images transmitted from the destination terminal and images of conference materials, for instance, may be displayed on the screen of the monitor 112 one after another. More precisely, while the TV conference application program is executed, the image on the screen is kept updated with a moving image. Sound in the user's side is inputted through the microphone 208 and the sound from the destination terminal is heard through the speaker 209 or a headset (not shown) during the conference (step S303).

However, since the updating of the image on the screen of the monitor 112 or the inputting of sound are not user input events, in the screen saver application program, the process moves from step S323 to step S325 and the counter is increased in step S326. Then, when the value of the counter becomes equal or greater than the set time, the determination in step S326 becomes YES, and the predetermined screen saver image starts being displayed.

When the conference ends in step S304, then the connection is disconnected in step S305, thereby completing the TV conference application program.

In the conventional TV conference system as described above, when the user starts TV conference without inactivating the screen saver function, if the user does not operate input devices, such as the mouse and the keyboard, for a while, a screen saver image starts to be displayed after a preset time has passed. Since the screen saver image hides a TV conference window, the conference is interrupted, which is very inconvenient. When this occurs, the user has to operate the input device, such as the mouse and the keyboard, to recover the TV conference window.

In order to prevent the aforesaid inconvenience, the user has to inactivate the screen saver function before starting conference, and activate the screen saver function after the conference ends.

SUMMARY OF THE INVENTION

The present invention has been made in consideration of the above situation, and has as its object to provide a control method for automatically controlling screen saver function so that a window for a predetermined application displayed on an information processing apparatus is not hidden by a screen saver image during executing the predetermined application program, such as a TV conference application program, an information processing apparatus and an image sensing system adopting the method.

According to the present invention, the foregoing object is attained by providing an information processing apparatus having a function for displaying a screen saver image when no user input event occurs for a predetermined period comprising: inactivating means for automatically inactivating screen saver function during performing predetermined processing.

The foregoing object is also attained by providing an image sensing system having a function for displaying a screen saver image when no user input event occurs for a predetermined period comprising: inactivating means for automatically inactivating screen saver function during image sensing operation.

Further, the foregoing object is also attained by providing a control method for controlling a function for displaying a screen saver image when no user input event occurs for a predetermined period comprising: an inactivating step of automatically inactivating screen saver function during performing predetermined processing.

Furthermore, the foregoing object is also attained by providing a computer program for controlling a function for displaying a screen saver image when no user input event occurs for a predetermined period comprising: first computer readable program code means for automatically inactivating screen saver function during performing predetermined processing.

Preferably, pseudo user input events are generated for inactivating the screen saver function.

Alternatively, a command for inactivating the screen saver function is generated and transmitted via an application program interface (API) to inactivate the screen saver function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

Note, the present invention will be explained in a form of a TV conference system, however, the present invention is not limited to the TV conference system and can be applied to any system in which a screen saver application program can be installed. Further, the present invention can be in a form of a storage medium storing a program realizing the present invention.

First Embodiment

Figure 1:
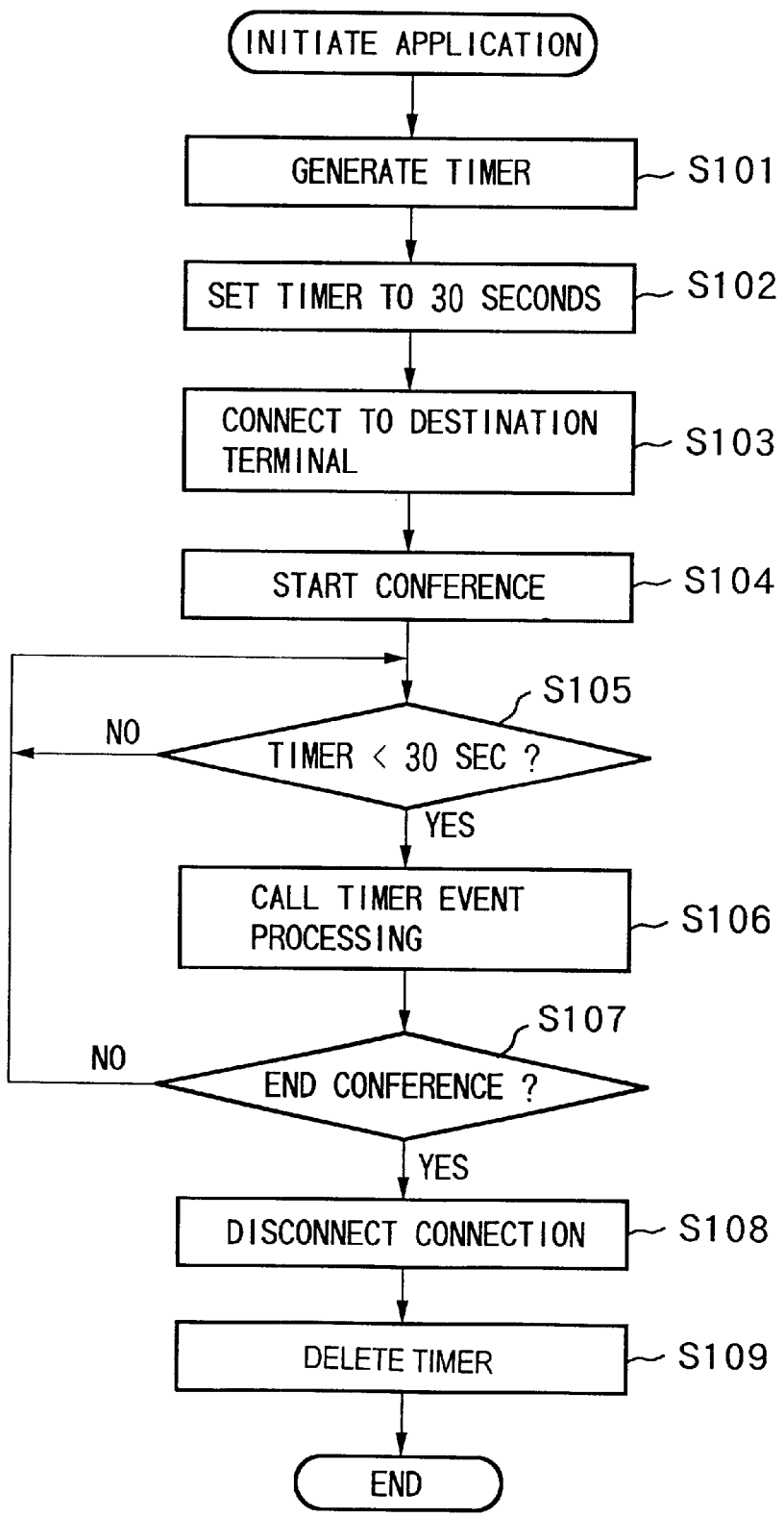
FIG. 1 is a flowchart of a TV conference application according to a first embodiment of the present invention.
Figure 2:
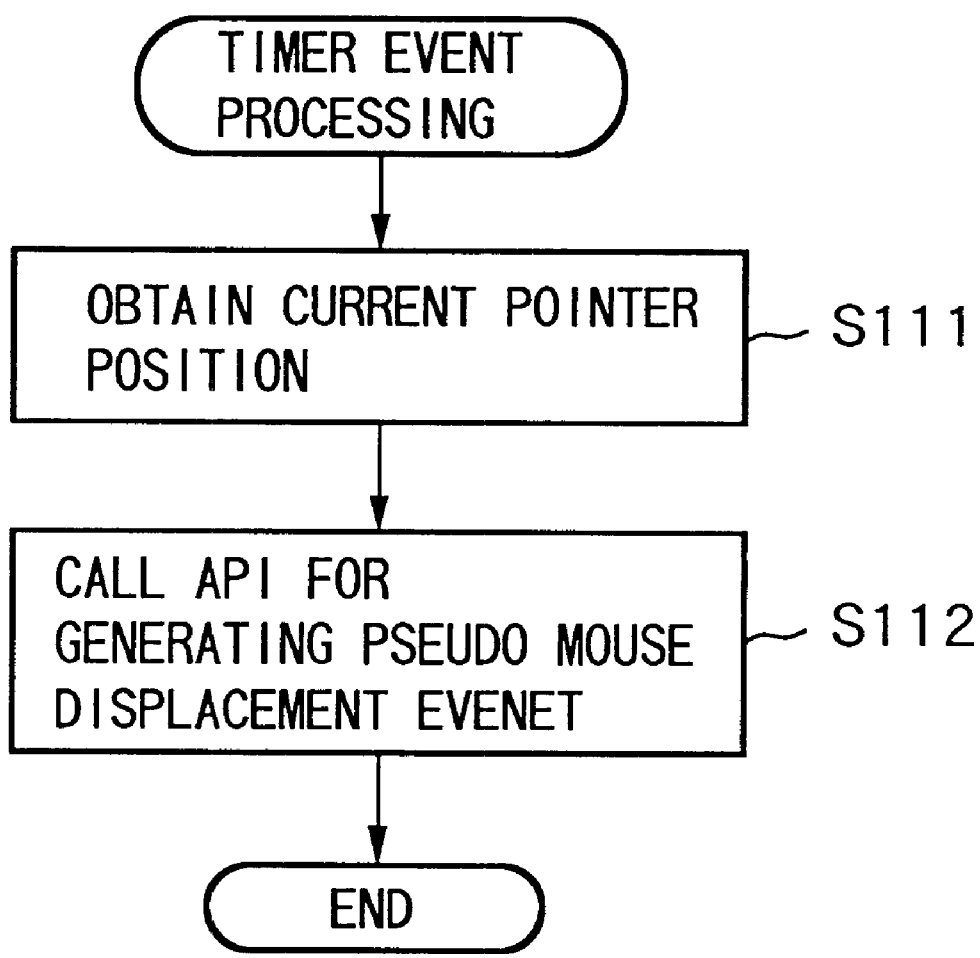
FIG. 2 is a flowchart of a subroutine called in the processing shown in FIG. 1 according to the first embodiment of the present invention.
Figure 3:
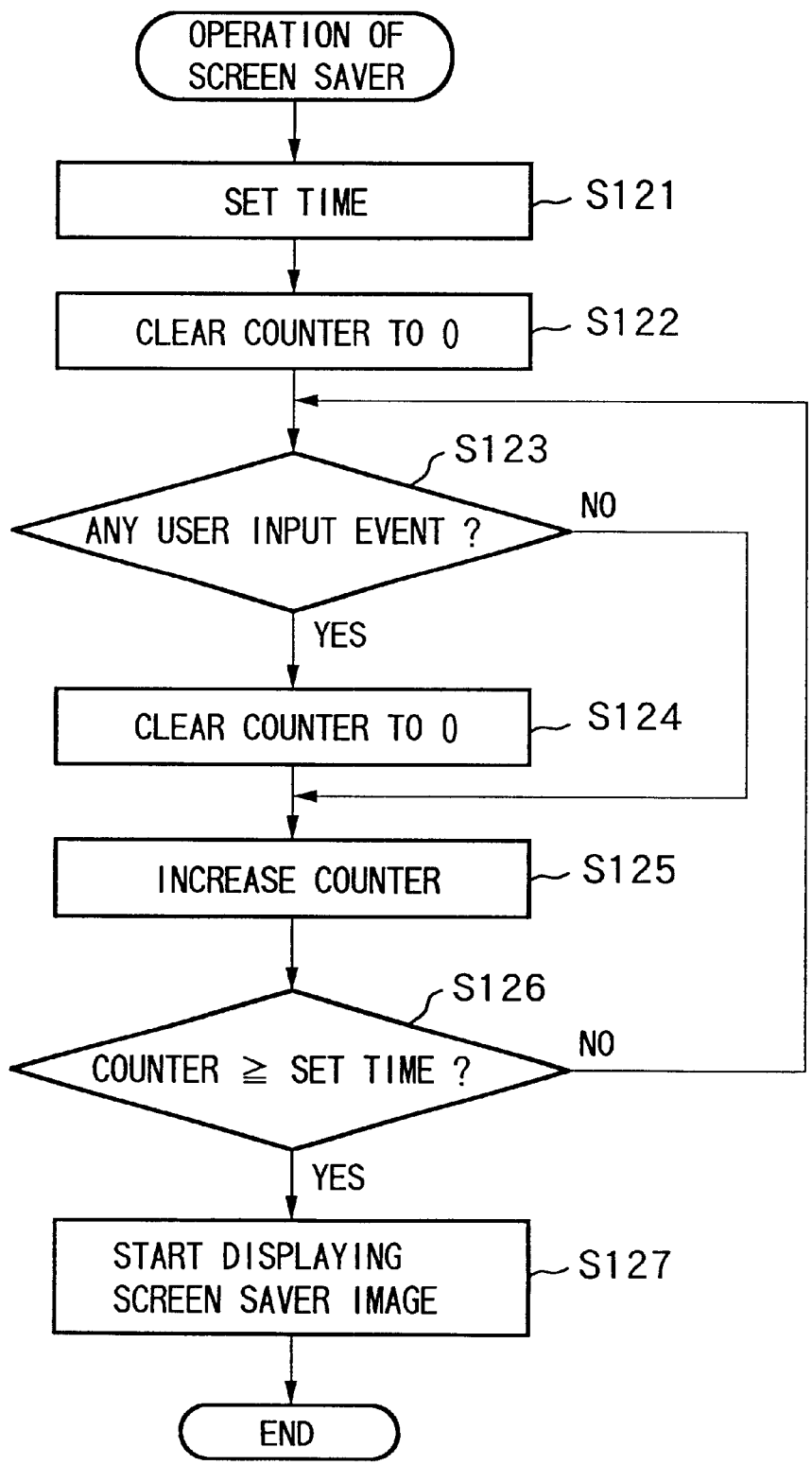
FIG. 3 is a flowchart for briefly explaining an operation of a screen saver.
Figure 4:
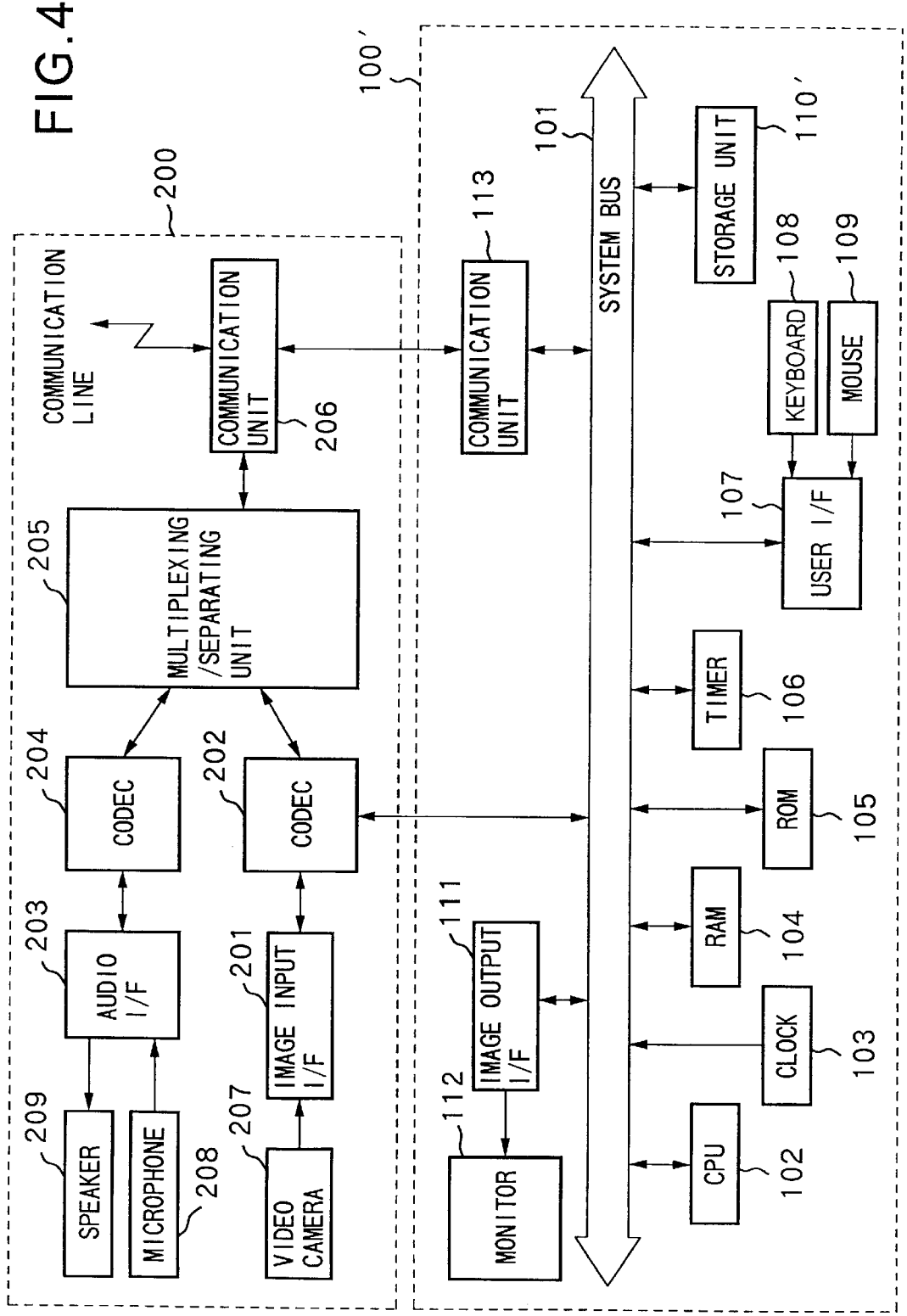
FIG. 4 is a block diagram illustrating a TV conference system according to the first embodiment of the present invention.
Figure 8:
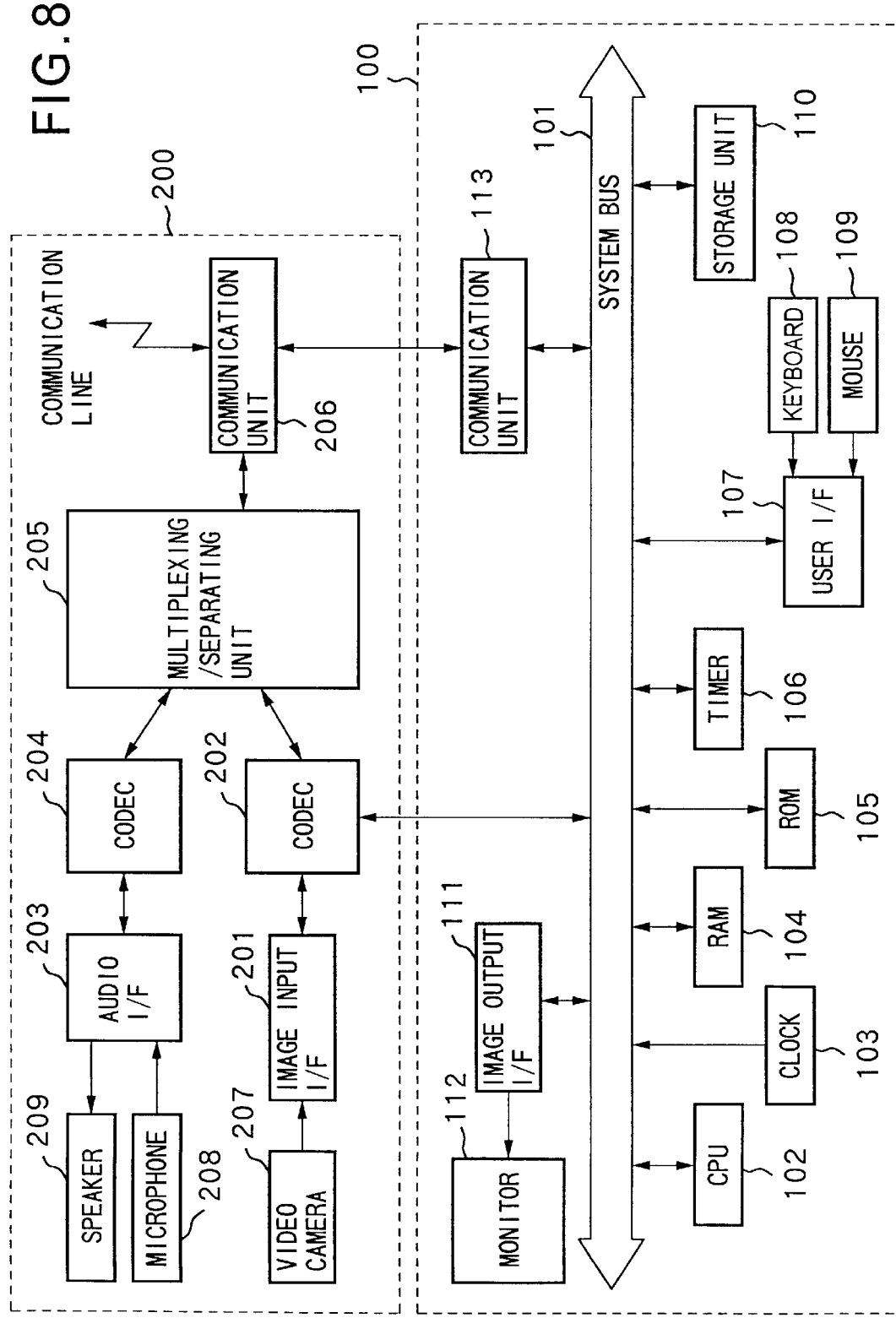
FIG. 8 is a block diagram illustrating a conventional TV conference system.

FIGS. 1 to 3 are flowcharts showing an operation of a TV conference system according to the first embodiment of the present invention. FIG. 4 is a block diagram illustrating a hardware configuration of the TV conference system according to the first embodiment. The configuration shown in FIG. 4 is basically the same as that of the conventional configuration shown in FIG. 8, however, a program stored in the storage unit 110' in FIG. 4 is different from the program stored in the storage unit 110 in FIG. 8. The program stored in the storage unit 110' is executed by the CPU 102.

Referring to FIG. 1, when the TV conference application program stored in the storage unit 110' is initiated, a software timer for inactivating a screen saver is generated in step S101. The timer is set to a period shorter than time set in the screen saver application. Generally, the time is set by minute in the screen saver application, therefore, the timer for inactivating the screen saver is set to 30 seconds, for instance, which is shorter than one minute. Then, the timer starts in step S102. Thereafter, since preparation for inactivating the screen saver is completed, the TV conference system is connected to a destination terminal in step S103. After the connection is established, conference starts in step S104. Even when the user does not perform any input operation using the mouse 109 or the keyboard 108 for a while during the conference, images transmitted from the destination terminal and images of conference materials, for instance, may be displayed on the screen of the monitor 112 one after another. More precisely, while the TV conference application program is executed, the image on the screen is kept updated. Sound in the user's side is inputted through the microphone 208 and the sound from the destination terminal is heard through the speaker 209 or a headset (not shown) during the conference.

However, since the above updating of the image or inputting of sound are not user input events, a counter in the screen saver application increases without being cleared to 0.

In the first embodiment, after 30 seconds which is set to the timer in step S105 have passed, a timer event which calls a timer event processing routine is generated in step S106.

In the timer event processing routine, which is shown in the flowchart in FIG. 2, the current pointer position is obtained by calling an application program interface (API) of a window operating system in step S111. Then, a routine relating to mouse displacement is called via the API of the window system to generate a pseudo mouse displacement event in step S112. Since the actual position of the mouse 109 is not changed, the pointer displayed on the screen does not move and blinks momentarily.

Figure 9:
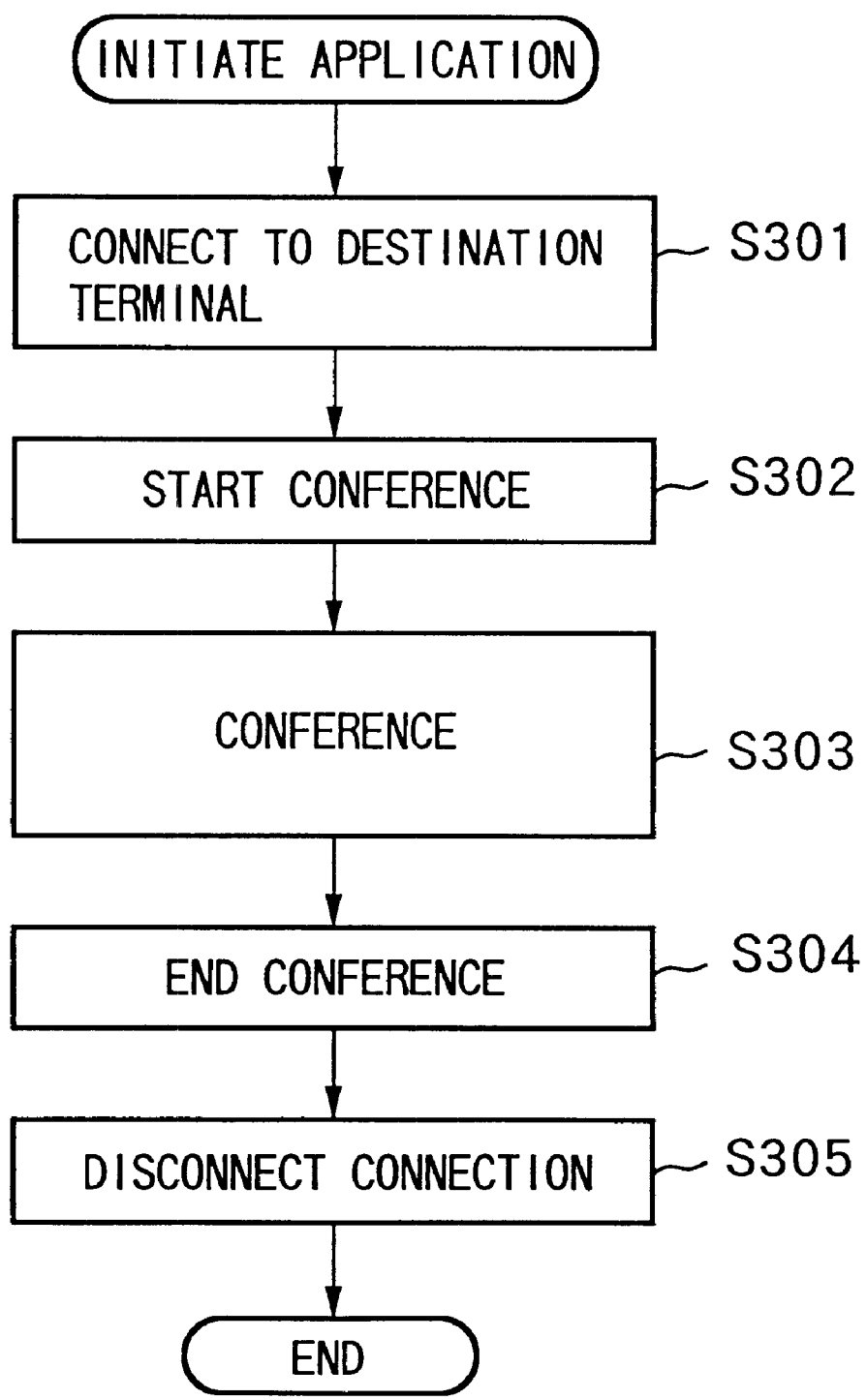
FIG. 9 is a flowchart of conventional TV conference application.
Figure 10:
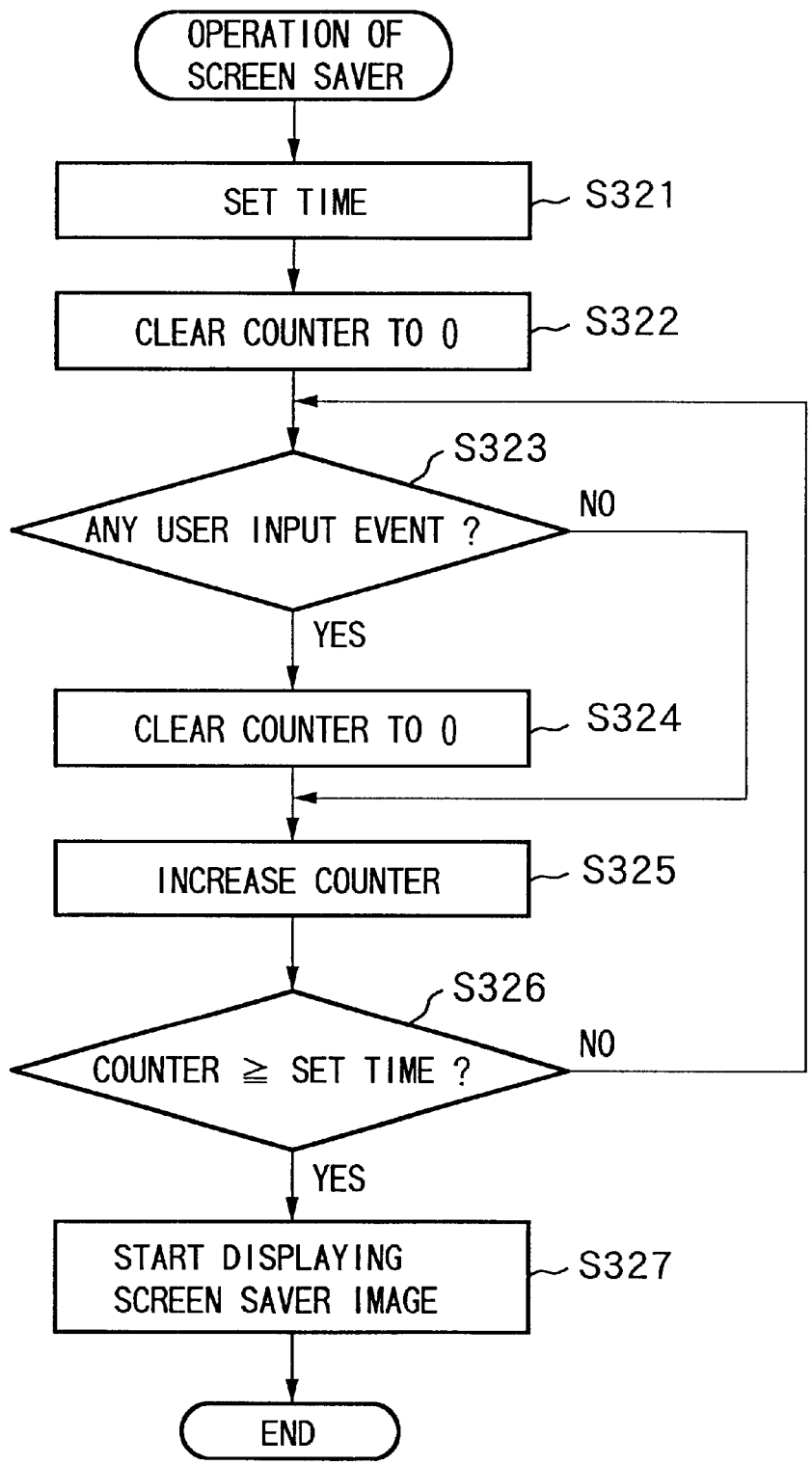
FIG. 10 is a flowchart for briefly explaining an operation of a screen saver.

The operation of the screen saver shown in FIG. 3 is basically the same as that explained with reference to FIG. 9. Time when a screen saver image starts to be displayed is set in step S121. Then, an internal counter is cleared to 0 in step S122. However, in the first embodiment of the present invention, since the mouse displacement event occurs every 30 seconds in step S112 in FIG. 2, the determination in step S123 becomes YES, thereby the counter is cleared in step S124, and starts counting from 0 in step S125. Since the counter is cleared to 0 in step S124, the determination in step S126 always becomes YES, thereby the process returns to step S123, thus, a screen saver image is not displayed. In FIG. 3, in step S127, when the value of the counter is equal or greater than the set time, the screen saver image starts to be displayed.

After the conference is over, the TV conference application is terminated by the operation of the user or a user in the destination terminal (YES in step S107), and the connection between the TV conference system and the destination terminal is disconnected in step S108. Next in step S109, the timer for inactivating the screen saver generated in step S101 is deleted, and the application is completed.

According to the first embodiment as described above, even if no user input event occurs during a conference using a TV conference system, it is possible to inactivate screen saver function, thereby preventing a screen saver image from being displayed during the conference.

Second Embodiment

Figure 5:
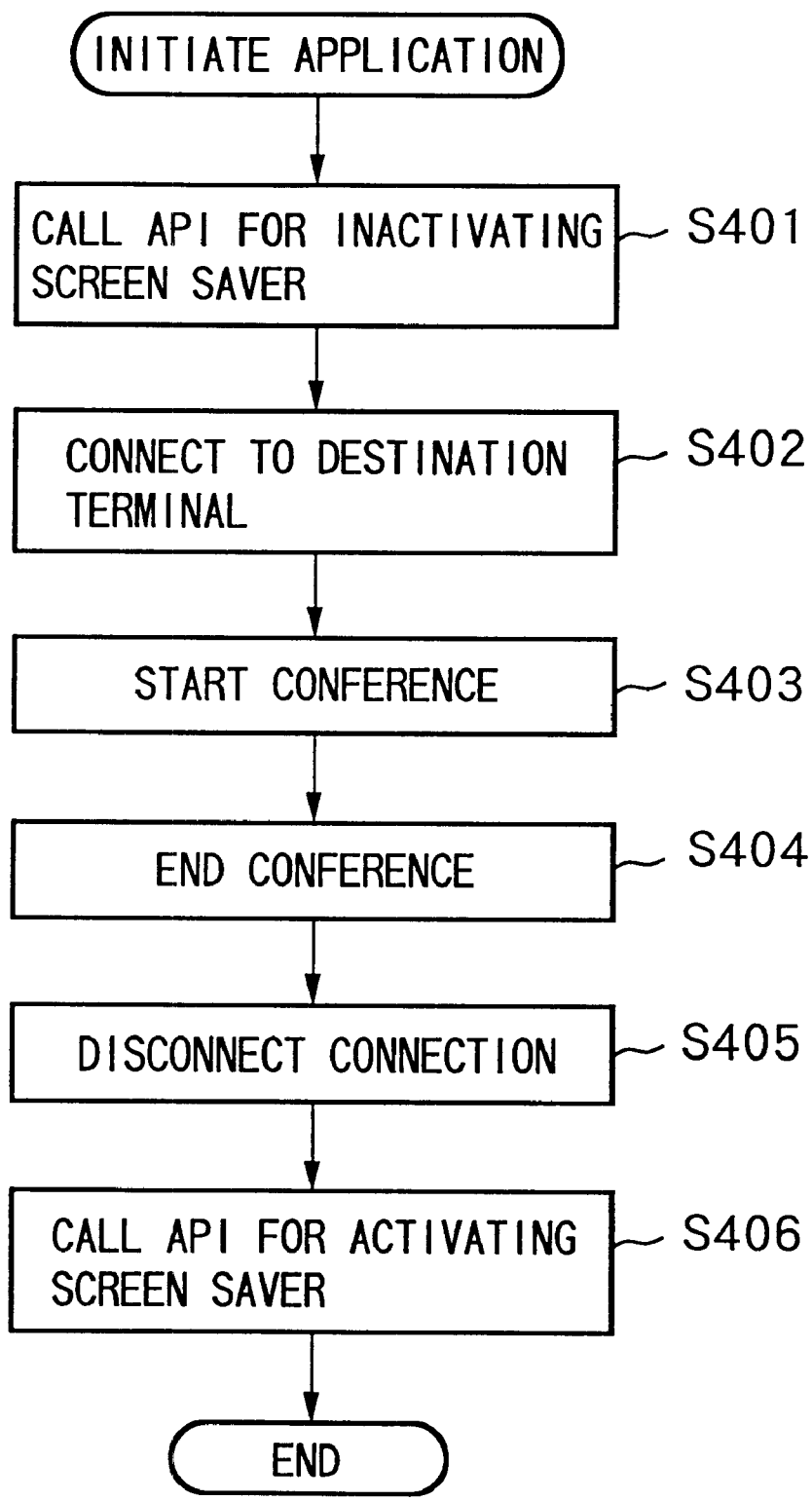
FIG. 5 is a flowchart of a TV conference application according to a second embodiment of the present invention.

FIG. 5 is a flowchart of an operation of a TV conference system according to the second embodiment. In the second embodiment, a case where a screen saver has an application program interface (API) and can be activated and inactivated from another application program is explained. A hardware configuration of a TV conference system according to the second embodiment is the same as that shown in FIG. 4 of the first embodiment.

When the TV conference application program stored in the storage unit 110' is initiated, an API is called, in step S401, for inactivating the screen saver. After the screen saver is inactivated, the TV conference system is connected to a destination terminal in step S402. After the connection is established, a conference starts in step S403. Since the screen saver is inactivated, even when no user input using the mouse 109 and the keyboard 108 does not occur during the conference, the screen saver does not function.

After the conference is over, the TV conference application is terminated in response to an operation of the user or a user in the destination terminal in step S404, and the connection between the TV conference system and the destination terminal is disconnected in step S405. Then, the API is called for activating the screen saver in step S406, thereby the TV conference application is completed.

According to the second embodiment as described above, even if no user input event occurs during a conference using a TV conference system, a screen saver is inactivated before starting the conference, thereby preventing a screen saver image from being displayed during the conference.

Modification of the Second Embodiment

In the second embodiment, the screen saver is always inactivated before starting a TV conference, and activated after TV conference ends, as shown in FIG. 5. However, some users may prefer to keep a screen saver inactivated.

Figure 6:
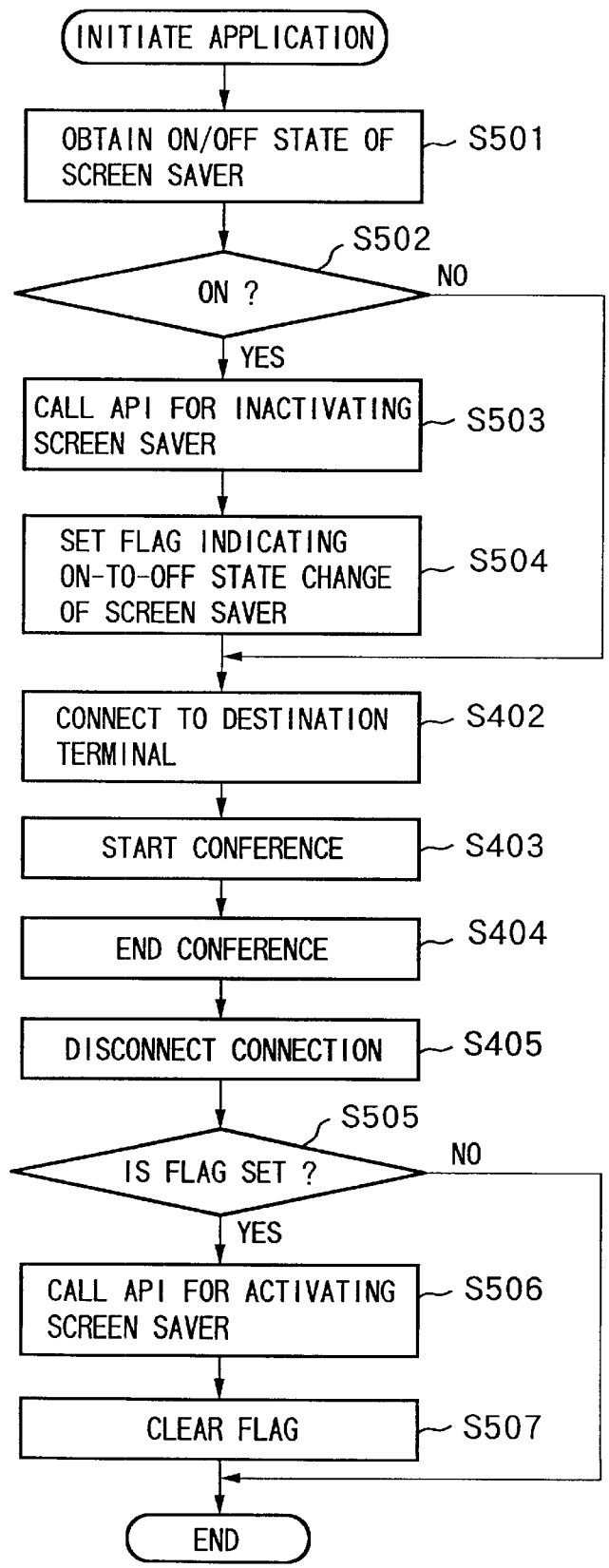
FIG. 6 is a flowchart of a TV conference application according to a modification of the second embodiment of the present invention.

Accordingly, in a modification of the second embodiment, an on/off state of the screen saver before starting a TV conference is recovered after the TV conference ends. The modification of the second embodiment is explained below with reference to a flowchart shown in FIG. 6.

First, when the TV conference application program is initiated, the current on/off state of the screen saver is obtained in step S501. If it is determined in step S502 that the screen saver is on, then the process proceeds to step S503 where an API is called for inactivating the screen saver. After the screen saver is inactivated, the process proceeds to step S504 and a flag indicating the on-to-off state change of the screen saver is set, and the process proceeds to step S402. The conference is started in step S403. The conference is ended in step S404.

Whereas, if it is determined in step S502 that the screen saver is off, then the process directly proceeds to step S402. The processes from steps S402 to S405 are the same as those explained in the second embodiment with reference to FIG. 5, therefore, the explanation of those is omitted.

After the connection between the TV conference system and the destination terminal is disconnected in step S405, the state of the flag showing the on-to-off state change of the screen saver is checked. If the flag is set, then the process proceeds to step S506 where the API is called for activating the screen saver function, and the flag is cleared in step S507.

Whereas, if it is determined in step S505 that the flag is not set, the TV conference application is completed without calling the API.

According to the modification of the second embodiment as described above, in addition to the same advantage as that of the second embodiment, it is possible to recover the original on/off state of the screen saver function after the TV conference.

Note, in a case where the screen saver is inactivated, a message indicating that the screen saver is inactivated may be displayed temporary or until the TV conference is over.

Third Embodiment

Figure 7:
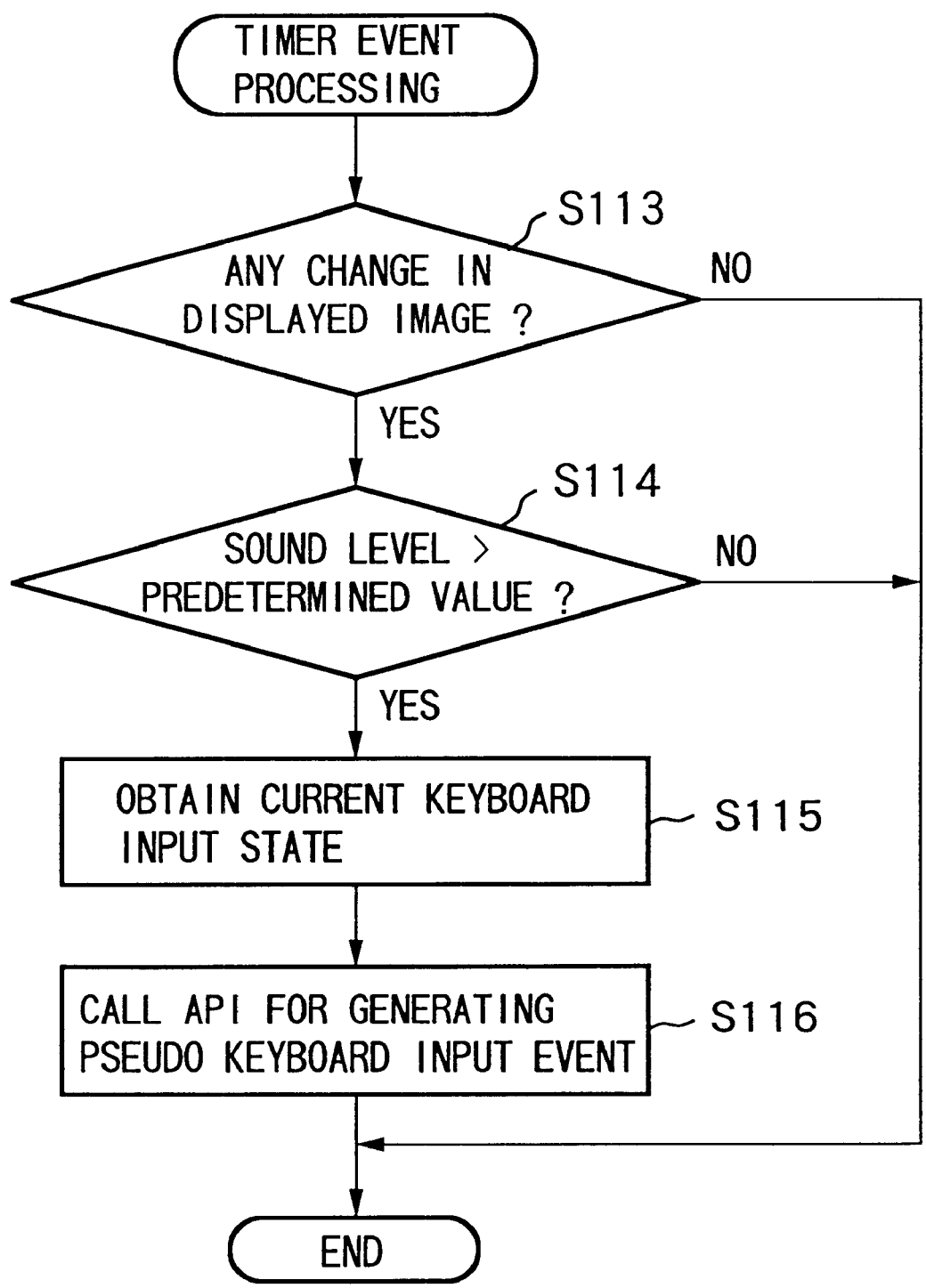
FIG. 7 is a flowchart of a subroutine called in the processing shown in FIG. 1 according to a third embodiment of the present invention.

FIG. 7 is a flowchart showing an operation according to the third embodiment of the present invention. Timer event processing in the third embodiment is different from that explained in the first embodiment with reference to FIG. 2. More specifically, in step S113 in the timer event processing routine in FIG. 7, whether a moving image captured by the video camera 207 30 seconds before and a currently displayed image are the same or not is determined on the basis of a movement vector, and if there is no change between the two images, then the timer event processing routine is finished.

Further, if it is determined in step S113 that there is a difference between the two images, then the process proceeds to step S114 where whether or not an input level of sound input by the microphone 208 is greater than a predetermined value is determined, and if not, the timer event processing routine is finished. If the input level is greater than the predetermined value, then the process proceeds to step S115 where a current input state of the keyboard 108 is obtained by calling an application program interface (API) of a window operating system. Then, in step S116 a routine relating to keyboard input is called via the API of the window system to generate a pseudo keyboard input event.

By configuring the TV conference system as described above, when the displayed image is changing and the sound level is greater than a predetermined level, the screen saver function is inactivated. Note, either the condition of step S113 or S114 may be omitted. In this configuration, it is possible to treat the change in displayed images and/or input of sound as a pseudo user input event.

Note, the present invention can be applied to any kind of image sensing system having screen saver function, and can be applied to a camcoder and a digital still camera having screen saver function, for instance.

According to the present invention as described above, even if no user input event occurs during executing a predetermined application program, it is possible to inactivate screen saver function, thereby preventing a screen saver image from being displayed while the predetermined application program has been executed.

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

What is claimed is:

1. An information processing apparatus comprising:
   means for providing a screen saver when no user input event occurs for a predetermined period, and
   inactivating means for automatically and periodically generating a pseudo user input event to inactivate the screen saver during predetermined processing.

2. The information processing apparatus according to claim 1, wherein said inactivating means generates a command for inactivating the screen saver function using an application program interface of a screen saver.

3. The information processing apparatus according to claim 1 further comprising:
   state determination means for obtaining and determining an on/off state of the screen saver function before starting the predetermined processing; and
   disabling means for disabling said inactivating means when said state determination means determines that the screen saver function is in an off state.

4. The information processing apparatus according to claim 1 further comprising:
   sound input means for inputting sound;
   sound determination means for determining whether or not a level of sound input by said sound input means is greater than a predetermined level; and
   disabling means for disabling said inactivating means when said sound determination means determines that the level of the input sound is not greater than the predetermined level.

5. The information processing apparatus according to claim 1 further comprising:
   image input means for inputting a moving image from an external device;
   image determination means for determining whether or not there is a difference between an image currently inputted by said image input means and an image input by said image input means a predetermined period before; and
   disabling means for disabling said inactivating means when said image determination means determines that there is no difference between the two images.

6. An image sensing system comprising:
   means for providing a screen saver when no user input event occurs for a predetermined period, and
   inactivating means automatically and periodically generating a pseudo user input event to inactivate the screen saver during image sensing operation.

7. The image sensing system according to claim 6, wherein said inactivating means generates a command for inactivating the screen saver function using an application program interface of a screen saver.

8. The image sensing system according to claim 6 further comprising:
   state determination means for obtaining and determining an on/off state of the screen saver function before starting image sensing operation; and
   disabling means for disabling said inactivating means when said state determination means determines that the screen saver function is in an off state.

9. The image sensing system according to claim 6 further comprising:
   sound input means for inputting sound;
   sound determination means for determining whether or not a level of sound input by said sound input means is greater than a predetermined level; and
   disabling means for disabling said inactivating means when said sound determination means determines that the level of the input sound is not greater than the predetermined level.

10. The image sensing system according to claim 6 further comprising:
    image input means for inputting an image;
    image determination means for determining whether or not there is a difference between an image currently inputted by said image input means and an image input by said image input means a predetermined period before; and
    disabling means for disabling said inactivating means when said image determination means determines that there is no difference between the two images.

11. A control method comprising:
    a providing step for providing a screen saver when no user input event occurs for a predetermined period, and
    an inactivating step of automatically and periodically generating a pseudo user input event to inactivate the screen saver during predetermined processing.

12. The control method according to claim 11 further comprising an activating step of automatically activating the screen saver function after completing the predetermined processing.

13. The control method according to claim 12, wherein, in said inactivating step, a command for inactivating the screen saver function is generated using an application program interface of a screen saver and in said activating step, a command for activating the screen saver function is generated using the application program interface of the screen saver.

14. The control method according to claim 12 further comprising:

a state determination step of obtaining and determining an on/off state of the screen saver function before said inactivating step; and a disabling step of disabling said inactivating step and said activating step when it is determined in said state determination step that the screen saver function is in an off state.

15. The control method according to claim 11 further comprising:

a sound input step of inputting sound;

a sound determination step of determining whether or not a level of sound input in said sound input step is greater than a predetermined level; and a disabling step of disabling said inactivating step when it is determined in said sound determination step that the level of the input sound is not greater than the predetermined level.

16. The control method according to claim 11 further comprising:

an image input step of inputting an image;

an image determination step of determining whether or not there is a difference between an image currently inputted in said image input step and an image input in said image input step a predetermined period before; and a disabling step of disabling said inactivating step when it is determined in said image determination step that there is no difference between the two images.

17. The control method according to claim 11, wherein said predetermined processing is to make an information processing apparatus function as a part of a TV conference system.

18. The control method according to claim 11, wherein said predetermined processing is to make an information processing apparatus function as a part of a TV phone system.

19. A computer readable medium storing a computer program comprising:

code for providing a screen saver when no user input event occurs for a predetermined period, and first computer readable program code for automatically and periodically generating a pseudo user input event to inactivate the screen saver during predetermined processing.

20. The computer readable medium according to claim 18 further comprising second computer readable program code means for automatically activating the screen saver function after completing the predetermined processing.

21. The computer readable medium according to claim 20, wherein said first computer readable program code means generates a command for inactivating the screen saver function using an application program interface of a screen saver and said second computer readable program code means generates a command for activating the screen saver function using the application program interface of the screen saver.

22. The computer readable medium according to claim 20 further comprising:

third computer readable program code means for obtaining and determining an on/off state of the screen saver function before the predetermined processing starts; and fourth computer readable program code means for disabling said first computer readable program code means and said second computer readable program code means when said third computer readable program code means determines that the screen saver function is in an off state.

23. The computer readable medium according to claim 19 further comprising:

fifth computer readable program code means for determining whether or not sound whose level is greater than a predetermined level is input; and sixth computer readable program code means for disabling first computer readable program code means when said fifth computer readable program code means determines that sound whose level is greater than a predetermined level is not inputted.

24. The computer readable medium according to claim 19 further comprising:

seventh computer readable program code means for determining whether or not there is a difference between an image currently inputted and an image input a predetermined period before; and eighth computer readable program code means for disabling said first computer readable program code means when said seventh computer readable program code means determines that there is no difference between the two images.

25. The computer readable medium according to claim 19, wherein said predetermined processing is to make an information processing apparatus function as a part of a TV conference system.

26. The computer readable medium according to claim 19, wherein said predetermined processing is to make an information processing apparatus function as a part of a TV phone system.

27. An information processing apparatus comprising:

a processor, control means for automatically controlling a screen saver function, inactivating means for automatically and periodically generating a pseudo user input event to inactivate the screen saver function, the inactivating means inactivates the screen saver function during the execution of a predetermined application program, wherein the predetermined application program does not activate the processor.

28. An information processing apparatus comprising:

means for providing a screen saver when no user input event occurs for a predetermined period, and means for automatically generating a pseudo user input event to inactivate the screen saver during predetermined processing, wherein the generation of the pseudo user input event is performed more than once.

29. An image sensing system comprising:

means for providing a screen saver when no user input event occurs for a predetermined period, and means automatically generating a pseudo user input event to inactivate the screen saver during image sensing operation, wherein the generation of the pseudo user input event is performed more than once.

30. A control method comprising:

a providing step for providing a screen saver when no user input event occurs for a predetermined period, and an inactivating step of automatically and periodically generating a pseudo user input event to inactivate the screen saver during predetermined processing, wherein the generation of the pseudo user input event is performed more than once.

31. A computer readable medium storing a computer program comprising:

code for providing a screen saver when no user input event occurs for a predetermined period, and first computer readable program code for automatically and periodically generating a pseudo user input event to inactivate the screen saver during predetermined processing, wherein the generation of the pseudo user input event is performed more than once.

32. An information processing apparatus comprising:

a processor, control means for automatically controlling a screen saver, inactivating means for automatically generating a pseudo user input event to inactivate the screen saver, the inactivating means inactivates the screen saver during the execution of a predetermined application program, wherein the predetermined application program does not activate the processor, and wherein the generation of the pseudo user input event is performed more than once.

33. A computer system to inactivate the screen saver during predetermined processing, the system including a computer readable medium, comprising:

a code component adapted to provide a screen saver when no user input event occurs for a predetermined period, and a first computer readable program code component adapted to automatically and periodically generate a pseudo user input event to inactivate the screen saver during predetermined processing.

34. A computer system to inactivate the screen saver during predetermined processing, the system including a computer readable medium, comprising:

a code component adapted to provide a screen saver when no user input event occurs for a predetermined period, and a first computer readable program code component adapted to automatically and periodically generate a pseudo user input event to inactivate the screen saver during predetermined processing, wherein the generation of the pseudo user input event is performed more than once.

35. An information processing apparatus comprising:

a unit adapted to provide a screen saver when no user input event occurs for a predetermined period, and an inactivating unit adapted to automatically and periodically generate a pseudo user input event to inactivate the screen saver during predetermined processing.

36. The information processing apparatus according to claim 35, wherein said inactivating unit generates a command for inactivating the screen saver function using an application program interface of a screen saver.

37. The information processing apparatus according to claim 35, further comprising:

a state determination unit adapted to obtain and determine an on/off state of the screen saver function before starting the predetermined processing; and a disabling unit adapted to disable said inactivating unit when said state determination unit determines that the screen saver function is in an off state.

38. The information processing apparatus according to claim 35, further comprising:

a sound input unit adapted to input sound;

a sound determination unit adapted to determine whether a level of sound input by said sound input unit is greater than a predetermined level; and a disabling unit adapted to disable said inactivating unit when said sound determination unit determines that the level of the input sound is not greater than the predetermined level.

39. The information processing apparatus according to claim 35, further comprising:

an image input unit adapted to input a moving image from an external device;

an image determination unit adapted to determine whether there is a difference between an image currently inputted by said image input unit and an image input by said image input unit a predetermined period before; and a disabling unit adapted to disable said inactivating unit when said image determination unit determines that there is no difference between the two images.

40. An image sensing system comprising:

a unit adapted to provide a screen saver when no user input event occurs for a predetermined period, and an inactivating unit adapted to automatically and periodically generate a pseudo user input event to inactivate the screen saver during image sensing operation.

41. The image sensing system according to claim 40, wherein said inactivating unit generates a command for inactivating the screen saver using an application program interface of a screen saver.

42. The image sensing system according to claim 40, further comprising:

a state determination unit adapted to obtain and determine an on/off state of the screen saver function before starting image sensing operation; and a disabling unit adapted to disable said inactivating unit when said state determination unit determines that the screen saver function is in an off state.

43. The image sensing system according to claim 40, further comprising:

a sound input unit adapted to input sound;

a sound determination unit adapted to determine whether a level of sound input by said sound input unit is greater than a predetermined level; and a disabling unit adapted to disable said inactivating unit when said sound determination unit determines that the level of the input sound is not greater than the predetermined level.

44. The information processing apparatus according to claim 40, further comprising:

an image input unit adapted to input an image;

an image determination unit adapted to determine whether there is a difference between an image currently inputted by said image input unit and an image input by said image input unit a predetermined period before; and a disabling unit adapted to disable said inactivating unit when said image determination unit determines that there is no difference between the two images.

45. A control method comprising:

providing a screen saver when no user input event occurs for a predetermined period; and automatically and periodically generating a pseudo user input event to inactivate the screen saver during predetermined processing.

46. The control method according to claim 45 further comprising automatically activating the screen saver function after completing the predetermined processing.

47. The control method according to claim 46, wherein
a command for inactivating the screen saver function is generated using an application program interface of a screen saver; and
a command for activating the screen saver function is generated using the application program interface of the screen saver.

48. The control method according to claim 46, further comprising:
obtaining and determining an on/off state of the screen saver function before said inactivating; and
disabling said inactivating and said activating when it is determined that the screen saver function is in an off state.

49. The control method according to claim 45, further comprising:
inputting sound;
determining whether a level of sound input by said inputted sound is greater than a predetermined level; and
disabling said inactivating when it is determined that the level of the inputted sound is not greater than the predetermined level.

50. The control method according to claim 45, further comprising:
inputting an image;
determining whether there is a difference between an image currently inputted and an image inputted a predetermined period before; and
disabling said inactivating when it is determined that there is no difference between the two images.

51. The control method according to claim 45, wherein said predetermined processing is to make an information processing apparatus function as a part of a TV conference system.

52. The control method according to claim 45, wherein said predetermined processing is to make an information processing apparatus function as a part of a TV phone system.

53. An information processing apparatus comprising:
a processor;
a controller adapted to automatically control a screen saver function;
an inactivating unit adapted to automatically and periodically generate a pseudo user input event to inactivate the screen saver function;
the inactivating unit inactivates the screen saver function during the execution of a predetermined application program, wherein the predetermined application program does not activate the processor.

54. An information processing apparatus comprising:
a controller adapted to provide a screen saver when no user input event occurs for a predetermined period; and
a pseudo user event generator adapted to automatically and periodically generate a pseudo user input event to inactivate the screen saver during predetermined processing,
wherein the generation of the pseudo user input event is performed more than once.

55. An image sensing system comprising:
a controller adapted to provide a screen saver when no user input event occurs for a predetermined period; and
a pseudo user event generator adapted to automatically and periodically generate a pseudo user input event to inactivate the screen saver during image sensing operation,
wherein the generation of the pseudo user input event is performed more than once.

56. A control method comprising:
providing a screen saver when no user input event occurs for a predetermined period; and
automatically and periodically generating a pseudo user input event to inactivate the screen saver during predetermined processing,
wherein the generation of the pseudo user input event is performed more than once.

57. A computer readable medium storing a computer program comprising:
a code unit for adapted to provide a screen saver when no user input event occurs for a predetermined period, and
a first computer readable program code unit adapted to automatically and periodically generate a pseudo user input event to inactivate the screen saver during predetermined processing,
wherein the generation of the pseudo user input event is performed more than once.

58. An information processing apparatus comprising:
a processor,
a controller adapted to automatically control a screen saver,
an inactivating unit adapted to automatically generate a pseudo user input event to inactivate the screen saver, the inactivating unit inactivates the screen saver during the execution of a predetermined application program, wherein the predetermined application program does not activate the processor, and
wherein the generation of the pseudo user input event is performed more than once.

* * * * *

UNITED STATES PATENT AND TRADEMARK OFFICE
CERTIFICATE OF CORRECTION

PATENT NO.    : 6,404,447 B1
DATED         : June 11, 2002
INVENTOR(S)   : Kitagawa It is certified that error appears in the above-identified patent and that said Letters Patent is hereby corrected as shown below:

<u>Title page,</u>
Item [56], References Cited, U.S. PATENT DOCUMENTS: please delete the following:
-- 5,706,457 A * 1/1998 Dwyer et al. ………....345/349 --

<u>Column 5,</u>
Line 29, "does not occur during" should read -- occurs during --

<u>Column 9,</u>
Line 47, should recite dependency from Claim 19.

Signed and Sealed this

Seventeenth Day of December, 2002

JAMES E. ROGAN
*Director of the United States Patent and Trademark Office*